US012763096B2

(12) United States Patent
Bachura et al.

(10) Patent No.: US 12,763,096 B2
(45) Date of Patent: Oct. 13, 2026

(54) AI-BASED AUTOMATED PERSONALITY AND BEHAVIOR ANALYTIC AND ASSESSMENT SYSTEM AND METHOD

(71) Applicant: Arche AI, LLC, San Antonio, TX (US)

(72) Inventors: Eric A. Bachura, Boerne, TX (US); Michael W. Beadle, San Antonio, TX (US); Jessica C. Whiting, Eagle, ID (US)

( * ) Notice: Subject to any disclaimer, the term of this patent is extended or adjusted under 35 U.S.C. 154(b) by 189 days.

(21) Appl. No.: 18/791,887

(22) Filed: Aug. 1, 2024

(65) Prior Publication Data

US 2025/0046334 A1 Feb. 6, 2025

Related U.S. Application Data

(60) Provisional application No. 63/530,304, filed on Aug. 2, 2023.

(51) Int. Cl.

| | |
|---|---|
| ***G10L 25/48*** | (2013.01) |
| ***G10L 15/183*** | (2013.01) |
| ***G10L 25/27*** | (2013.01) |
| ***G10L 25/63*** | (2013.01) |

(52) U.S. Cl.
CPC ............ *G10L 25/63* (2013.01); *G10L 15/183* (2013.01); *G10L 25/27* (2013.01)

(58) Field of Classification Search
CPC ........ G10L 25/63; G10L 25/27; G10L 15/183
See application file for complete search history.

(56) References Cited

U.S. PATENT DOCUMENTS

| | | | | |
|---|---|---|---|---|
| 11,664,043 B2 * | 5/2023 | Lyu | B60R 11/0247 | 704/200 |
| 2011/0046947 A1 * | 2/2011 | Vaillancourt | G10L 19/26 | 704/226 |
| 2012/0016672 A1 * | 1/2012 | Chen | G09B 19/04 | 704/255 |

* cited by examiner

*Primary Examiner* — Ibrahim Siddo
(74) *Attorney, Agent, or Firm* — Fulton Jeang PLLC

(57) ABSTRACT

An AI-based personality and behavior analytic and assessment system includes an input interface configured for receiving input data containing audio speech, an automatic speech recognition module configured to receive the input data, recognize the spoken words in the input data, and generate an output representing the spoken words attributed to the individual, the output including speaking moments and audio slices, a machine learning text-based feature generation pipeline configured to receive the speaking moments and generate a numerical text-based feature set, a machine learning audio-based feature generation pipeline configured to receive the audio slices and generate a numerical audio-based feature set, a machine learning inference processor configured to receive at least one of the numerical text-based feature set and the numerical audio-based feature set, develop inferences from the feature sets, and generate scores representing the probabilities for a number of personality and behavioral traits of the individual.

19 Claims, 13 Drawing Sheets

Figure 3c: Dictionary Based Feature Generation for a given statement or set of statements

| | | | | | |
|---|---|---|---|---|---|
| The | -2.7 | -4 | -0.5 | 6.3 | 8.7 |
| market | -3.6 | 5.2 | -7.7 | -0.4 | 3.7 |
| is | 7.8 | 0.6 | -0.4 | -7.9 | 5.8 |
| volatile | 1.1 | -2.9 | 7.4 | 7.1 | 8.6 |
| and | -1.4 | 4.1 | -0.4 | -7.6 | -8.1 |
| our | -0.4 | 3.9 | -2.2 | 6 | 0.6 |
| customers | -8.2 | -3.8 | -2.5 | -0.8 | 1.2 |
| are | -3.9 | -1.5 | -6.8 | 3.2 | 1.6 |
| looking | 5.2 | -8.9 | -3.4 | 1.8 | 9.4 |
| to | 4.1 | 3.5 | 3.4 | -4.2 | -1.4 |
| us | 4.3 | 6.4 | 3.6 | 7.7 | 8.6 |
| for | -1.1 | 3.7 | 9.6 | 7.1 | -7.8 |
| assurance | 4.9 | 9.4 | 4.4 | 5.9 | 8.5 |
| ... | 8.5 | 6.4 | -0.4 | -5.1 | 4.5 |

AI-BASED AUTOMATED PERSONALITY AND BEHAVIOR ANALYTIC AND ASSESSMENT SYSTEM AND METHOD

CROSS-REFERENCE TO RELATED APPLICATION

The application claims the benefit of U.S. Provisional Patent Application No. 63/530,304, filed Aug. 2, 2023, which is incorporated by reference herein in its entirety.

FIELD

The present disclosure relates generally to speech analysis and, in particular, to a system and method for AI-based automated personality and behavior analysis and assessment.

BACKGROUND

Standard personality evaluation frameworks or tools such as the Big Five Personality Traits (OCEAN model), Myers-Briggs, DISC Assessment, Enneagram, etc., are commonly used by organizations to describe and assess individual differences in personality. These tools are used, for example, for recruiting and hiring, to determine whether candidates' personality traits align with the job requirements and the organization's culture. This helps companies make more informed hiring decisions and identify candidates who are the best fit for the role and the team. However, these existing tools are primarily based on data gleaned from the individual's answers to questions that are subject to biases and other influences that result in inaccurate outcomes.

Another conventional evaluation tool, the polygraph, is used to determine whether an individual is telling the truth. The polygraph is a machine that measures various physiological responses such as heart rate, blood pressure, respiratory rate, and galvanic skin response in an individual who is posed a series of questions. The polygraph examiner analyzes the physiological data and looks for patterns of physiological changes that occur when answering relevant questions compared to control or irrelevant questions. An increase in physiological responses during the relevant questions may be interpreted as an indication of deception or stress related to lying. Some of the known problems and limitations associated with the accuracy of polygraph tests include false positives, false negatives, subjectivity of interpretation, countermeasures, individual differences, inconsistent results, and cultural or language barriers.

DETAILED DESCRIPTION

Organizations regularly require one or more rounds of interviews as part of the evaluation process for prospective employees. Present in nearly every employee evaluation process, interviews present a rich and abundant source of unstructured data that is likely to contain information relating to behavioral and personality characteristics. Similarly, responses in a cognitive load-inducing situation of an interrogative nature (e.g., an interview) are likely to contain leakage cues that can indicate deception and a broad range of personality and behavioral characteristics. However, variations in context and observer traits often introduce biases that prohibit consistent and accurate human assessment of the individual. The AI-based automated personality and behavior analytic and assessment system and method described herein use a machine learning (ML) inference model trained on an accepted and established ground truth that can be used to identify the complex patterns and associations that exist in the spoken language. The system and method described herein combine machine learning processes with established psychological theory and instrumentation so that already available data sources (spoken language in cognitive load-inducing situations) can be leveraged with careful analytic techniques to derive relevant features for machine learning model assessment.

The AI-based system and method described herein provide an automated personality and behavior analytic and assessment tool via a web-based (SaaS) user interface and an application programming interface (API). The machine learning inference models employed by the system go beyond the current standard of focusing on Natural Language Process (NLP) analytics by applying additional semantic analysis and advanced signal and spectral processing to provide a significantly more informed information space. A key component of this process is to align problem-relevant features to a particular inference model's target space. Data pipeline processes are configured to take in audio data (live streaming or stored file with audio information) in common formats to produce the necessary features for each machine learning inference model.

Figure 1:
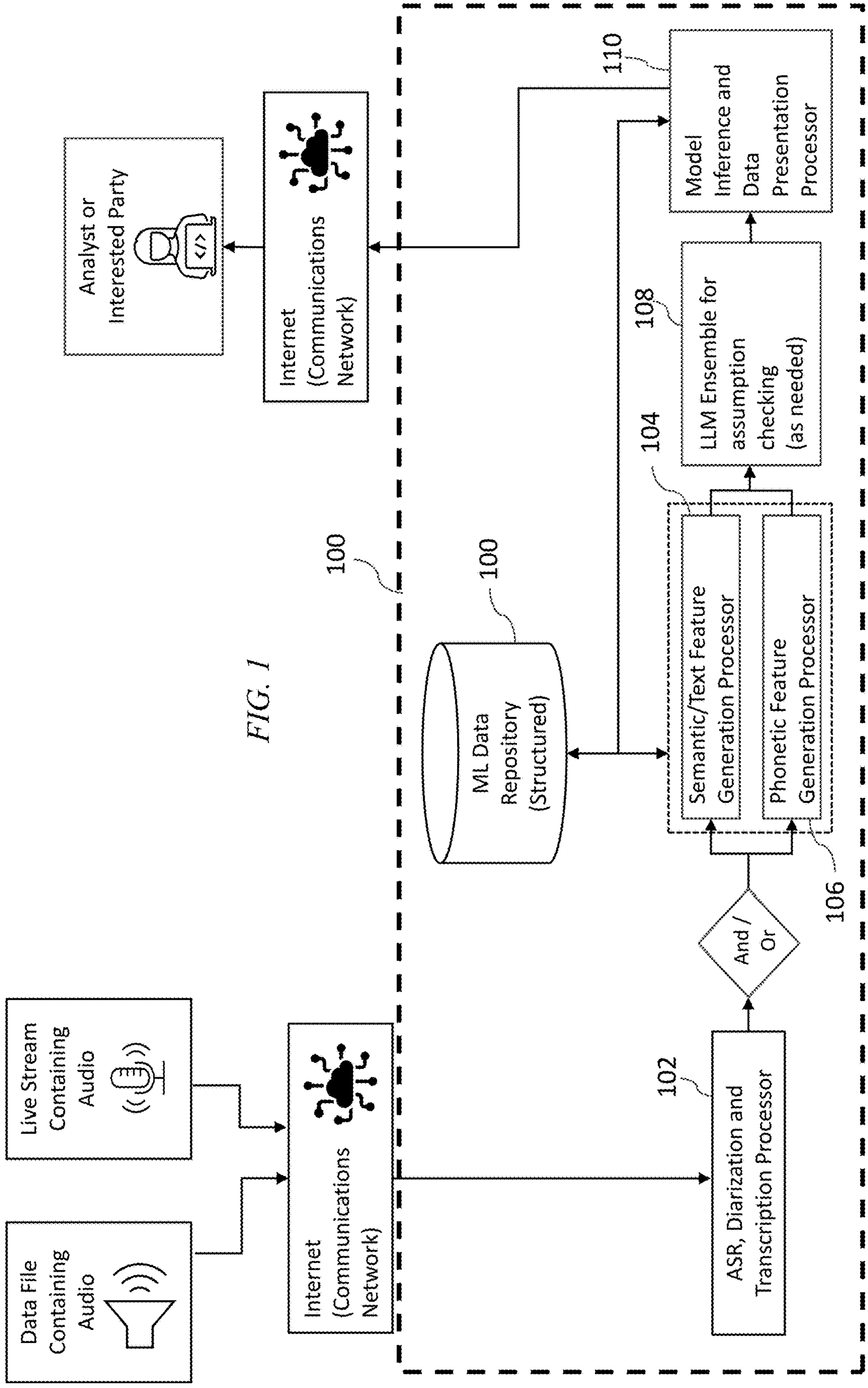
FIG. 1 is a simplified flow diagram illustrating the information flow in an exemplary embodiment of the AI-based automated personality and behavior analytic and assessment system and method according to the teachings of the present disclosure.

Referring to FIG. 1, audio input is received by the AI-based automated personality and behavior analytic and assessment system 100 as live streaming audio signals (at real-time or near real-time) or a stored file with audio data over a computer network such as the internet. The input data may be received by the assessment system via a web interface (as part of a SaaS offering) or an application programming interface (API). The input data is processed and analyzed using several techniques: automatic speech recognition with diarization and transcription 102, semantic/text feature generation 104 and/or phonetic feature generation 106. The process further includes Large Language Model (LLM) ensemble 108 and a model inference and data presentation module 110. The process flow shown in FIG. 1 illustrates three process flows for analyzing and assessing the audio speech data. The system and method 100 may process the data using a phonetic-only feature generation pipeline, a semantic-only feature generation pipeline, or a combination of both of these feature generation pipelines.

Figure 2:
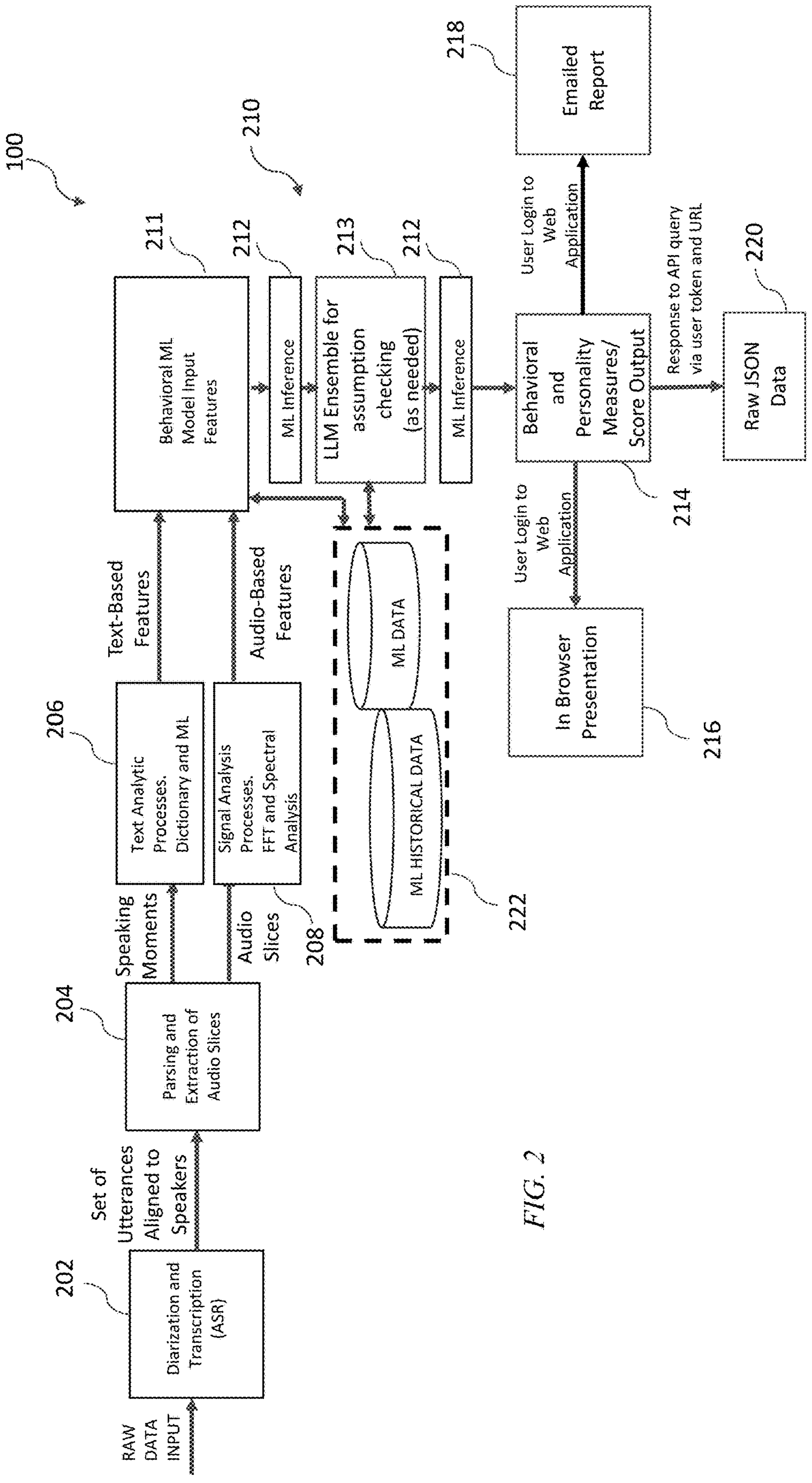
FIG. 2 is a more detailed flow diagrams illustrating the information flow in an exemplary embodiment of the AI-based automated personality and behavior analytic and assessment system and method according to the teachings of the present disclosure.

Referring to FIG. 2 for a more detailed flow diagram of the system and process, audio input is received by the AI-based automated personality and behavior analytic and assessment system 100 as live streaming audio signals (at real-time or near real-time) or a stored file with audio information that may have been transmitted over a computer network such as the internet. The audio input data may be received by the assessment system 100 via a web interface (as part of a SaaS offering) or an application programming interface (API). The raw input data is processed and analyzed using several techniques: automatic speech recognition (ASR) 202 that includes diarization (speaker identification, speaker segmentation, speaker tracking) and transcription (speech-to-text), parsing and extraction of audio slices 204 to generate speaking moments (defined as an uninterrupted set of spoken text, also known as a monologue) and audio slices. The speaking moments are analyzed based on text present in the speech 206, and the audio slices are analyzed based on the audio features present in the speech 208. The text-based analysis may include Machine Learning (ML) for text analytics, dictionary, and vector model processing. For example, phonetic feature generation is used to capture the acoustic properties of speech sounds, such as pitch, tone, duration, and formants. The process further includes large language model (LLM) evaluation 210, behavioral and personality model inferencing 214, and data presentation (e.g., via a web browser 216 and/or emailed report 218). The large language model evaluation process 210 includes behavioral machine learning model input features 211 and an ensemble of LLMs 213 that are a mixture of fine-tuned and retrieval-augmented generative (RAG) variants. This ensemble of LLM models 213 evaluates final inference model assumption requirements and generates a behavior and personality measures output 214, alleviating the need for human-in-the-loop interaction prior to the inferencing of the specialized behavioral models. These assumptions include the establishment of a cognitive load-inducing situation characterizing the statement being assessed, such as responding to an interrogative, and an evaluation of inference model appropriateness for statement content (this applies to semantic and semantic+phonetic inference models). In the event that inference models convey no assumption requirements; this process is not run. The LLM ensemble process 213 is used to both evaluate final inference model assumption requirements for improved accuracy and provide an informed summarization of the entire system process and analysis. The inference model analysis process accesses data from the machine learning data repository. The result from the analysis is then output and transmitted to one or more users who may be an analyst or other interested parties over the computer network/Internet. The historical repositories 222 store unstructured and structured data that are used to develop and train the ML tool. An optional LLM interpreter process is available prior to the final output. This final optional process in the system presents the user with a summarization and synthesized evaluation of the various inference model scores and the original statements. The output of this process treats inference model outputs as prompt modifiers and context addendums for the LLM, allowing text generation to be informed by the inference model outputs in addition to the original statements, resulting in an informed summarization of the entire system process.

The process flow shown in FIG. 2 illustrates three process flows for analyzing and assessing the audio speech data. The system and method 100 may process the data using a phonetic-only feature generation pipeline, a semantic-only feature generation pipeline, or a combination of both of these feature generation pipelines.

The system and process 100 illustrated in FIG. 2 are described in further detail below. The primary data source for the AI-based automated personality and behavior analytic and assessment process is the spoken language, which may come from a web browser-based user interface. The raw audio input data itself may be an audio file or a video file where only the audio track is processed. The system and method 100 are configured to receive data in a number of ways: user supplied or uploaded data files, URL references to a file location, and other means for input data retrieval. Other forms of data ingest capabilities, such as batch archive file processing, are also contemplated. The system and method 100 assumes that the spoken language input originated from a real person, and the spoken language is audible and interpretable. It is also assumed that the spoken language input is in English (although this methodology can be adapted to other languages), and this model have semantic feature sets as part of their input space. Another assumption is that the context of the speaking event is cognitive load-inducing. The majority of all dynamic speaking events that do not involve scripted recitation are characterized as cognitive load-inducing, and most multiple-speaker situations can be considered cognitive load-inducing if an interrogative element exists at one or more points in the dialogue. A secondary data source for a subset of the present processes is written text. These models carry minimal assumptions beyond the assumption that the text is comprehensible and representative of text prepared for a specific purpose (speech, long-form narrative, etc.).

Prior to entering a given feature extraction and data-analysis pipeline, the input files are assessed for the presence of an audio track. The audio data is extracted and presented to an appropriate pipeline which begins with feature generation. Features are generated from processes belonging to two separate top-level pipelines and first go through a diarization and transcription process 202. The Automatic Speech Recognition (ASR) and Transcription process 202 described herein may utilize open-source models for speech recognition, speaker diarization, and language transcription. The input audio is split into 30 second segments, converted to log-Mel spectrograms, and passed to a decoder. The decoder is trained to predict the corresponding captions, mixed with special tokens that guide a single model to perform tasks such as language recognition, phrase-level timestamping, multilingual speech transcription, and speech translation.

In particular, the ASR module 202 processes the audio input, and recognizes and transcribes the speech contained in the audio input into text format. ASR includes the steps of acoustic analysis, acoustic modeling, language modeling, decoding, and post-processing. The audio signal is first preprocessed to extract acoustic features that capture the spectral characteristics of the speech. Commonly used features include Mel-frequency cepstral coefficients (MFCCs) and filter banks. Statistical models are used to map the extracted acoustic features to phonemes, which are the basic sound units of a language. This acoustic model helps the system recognize different speech sounds based on the input audio. To improve the accuracy of recognition, the ASR module 202 may use language models that provide information about the probability of word sequences occurring in a particular language. Language models help the ASR process 202 to predict the most likely sequence of words based on the context and the spoken words. The ASR process 202 combines the acoustic and language models to decode the audio input and generate the most probable word sequence as the output. The decoding process involves finding the best matching word sequence given the audio and language models. After decoding, post-processing techniques may be applied to improve the transcription quality, such as correcting misrecognitions or handling punctuation and capitalization.

Diarization is a process used in speech and audio processing to segment an audio recording into distinct segments based on the identity of the speakers. Diarization is used to automatically identify who is speaking and when they are speaking in a multi-speaker audio stream such as is present in an interview context. The diarization process typically involves segmentation, speaker clustering, and post-processing. In segmentation, the audio stream is divided into shorter segments or turns. These segments can vary in duration, and they represent intervals where different speakers are speaking or taking turns in the conversation. In speaker clustering, the segments are grouped into clusters based on the identity of the speaker. Speaker clustering algorithms use various features extracted from the audio, such as pitch, energy, and other spectral characteristics, to identify speaker-specific patterns. The segments that share similar speaker characteristics are grouped into the same cluster, implying they belong to the same speaker. In post-processing, the results are refined and errors or inconsistencies are addressed.

Once the audio data has been diarized and transcribed, the resulting data contains sets of utterances, a speaker identifier (typically an incremented integer based on the speaker clustering), and a timestamp envelope reflecting the beginning and ending of the utterance. This data can be combined with consecutive utterances belonging to a speaker into a spoken text set that represents an individual monologue from a specific speaker. This can be done iteratively throughout the entire set of data to create a transcript of spoken text with accompanying speaking window timestamps.

The two data pipelines are text-based feature generation 206 and phonetic-based feature generation 208. Text-based (semantic) feature generation processes operate on the spoken text belonging to each speaking moment on the basis of an individual speaker. Text features include lexical complexity measures (various measures of the diversity of word use across a set of text (Carrol, 1964; Chotlos, 1944; Covington & McFall, 2010; Guiraud, 1954; Herdan, 1964; Johnson, 1944; Lisson & Ballier, 2018; Malvern et al., 2004; Mass, 1972; McCarthy & Jarvis, 2007, 2010)), psychometric dictionary-based measures (psychological word category occurrences ratioed over a total word count for the speaking moment), word vector measures (a vectorized language model that can provide quantified relational differences for word-to-word and word-group associations in addition to similarity measures that can convey semantic similarities), and machine learning-derived text features (e.g., topical analysis and word vectorization features).

Text-based feature generation is the process of transforming raw text data into a set of numerical or categorical features that can be used as input for machine learning algorithms. In natural language processing (NLP) and text mining tasks, the raw text data is not directly suitable for machine learning models, which typically require numerical representations of the data. The goal is to extract relevant information and patterns from the text, representing it in a format that machine learning algorithms can understand and process effectively. Techniques used in text-based feature generation include Bag-of-Words (BoW), TF-IDF (Term Frequency-Inverse Document Frequency), Word Embeddings, N-grams, Part-of-Speech (POS) Tagging, Named Entity Recognition (NER), Sentiment Analysis, and other techniques.

Phonetic-based feature generation processes 208 operate on the audio signal segment corresponding to either an utterance or a set of utterances (e.g., a spoken text speaking moment or monologue). In either case, the features derived are largely the same but correspond to and represent a different speaking window (which can then be used for an appropriate ML model, such as a phonetic convergence model or a behavioral trait model).

Phonetic features are derived from a spectral analysis process that, in part, extracts spectral features from an FFT (Fast Fourier Transformation) performed on a segment of the original audio signal. Because these features are aligned to an individually identified speaker, distributional and descriptive characteristics of the spectral features are also calculated and included as an input feature set for appropriate models (time-invariant/momentary). Distributional features in particular are informative for models that expect an input feature space to be aligned to a target that might vary based on internal fluctuations across a speaking moment. Conversely, some models use more traditional descriptive characteristics (such as the mean of a given mel-frequency cepstral coefficient set). A core component of this approach is that the input audio is split into individual utterances and then assessed on a moving window that is configurable but optimal at a minimum of 69 utterances. These are then passed to spectral analysis processes (producing features that include a range of MFCC's, ZCR, and other modality equivalencies), and passed to the model.

Phonetics-based (or audio-based) feature generation 208 is used to convert spoken language or phonetic representations of text into numerical or categorical features. Unlike text-based feature generation, which focuses on raw text data, phonetics-based feature generation deals with the sounds of spoken language and their corresponding representations. Phonetics-based feature generation involves extracting phonetic characteristics from speech signals and representing them in a format suitable for machine learning algorithms. Some common phonetics-based feature generation techniques include Mel-frequency Cepstral Coefficients (MFCCs), Pitch and Fundamental Frequency (FO), Formants, Spectral Features, Prosodic Features, and Phoneme Recognition.

The machine learning input features 211 are unique to each model. Broadly speaking, the models fall into 1 of 3 categories: 1)—The input features are some set of semantic features that were calculated (text analytics/NLP style processing), 2)—The input features are some set of phonetic features (spectral features resulting from the signals processing pipeline), or 3)—The input features are some sets taken from both semantic and phonetic features. The choice of input features depends upon a particular model's design when it was originally developed/trained/evaluated. The design choice is driven largely by associated theory and first principle approaches to understanding what information would allow a model to resolve a particular target. As an example, the deception model draws from theories in communication, linguistics, and psychology. In particular, cognitive load theory and leakage cue theory were both useful in designing/selecting appropriate features. In addition to this, our model design techniques enforce a "problem-relevancy+information discretization" approach to feature selection and engineering. We engineer features that have a reasonable expectation of being associated to the target problem AND that have minimal information overlap with other features.

The next step is machine learning inference processing 212. Often referred to as mental and/or biomarkers, the trained behavioral, personality, and psychological machine learning models and the LLM ensemble 213 are used to evaluate the text-based and/or phonetic-based generated features and determine scores aligned with traditional assessment scales (e.g., 5-point Likert scale) that are reflective of ground truth data procured with these traditional scales (used for development and training of our inference models), and if needed evaluate final inference model assumption requirements.

The results data or output (e.g., a set of scores) may be presented to the user in a number of ways, such as via the web browser-based interface, via an application programming interface (API), and in curated final reports in PDF format. The web application provides all user and group management capabilities and must be interfaced with initially before a user can leverage the API endpoint (which requires a token to be generated). The web application allows the user to visualize data in a tabular format as well as a number of visual representations of various data arrangements (i.e., charts and graphs). The API endpoint allows users to obtain the tabular data in a JSON (JavaScript Object Notation) format 220 to use for their own local analytic and visualization processes. The PDF reporting provides an emailed final result summary of the analysis and may additionally be informed by the LLM ensemble.

The assessment system and method 100 generate and provide scores for high-utility, low-availability behavioral traits that are not commonly found in existing automated tool sets, and low-availability behavioral traits that are not commonly found in existing automated toolsets and often require intense analysis performed by specialists. These behavioral traits include but are not limited to, "dark traits," communication style profiling, conversational attention measures, and probabilistic measures of deceptive/hidden/obscured elements in spoken language. Dark traits are a group of socially malevolent personality traits associated with negative and harmful behaviors. These traits are characterized by tendencies towards manipulation, self-centeredness, callousness, and exploitation of others for personal gain. They include Machiavellianism, narcissism, and psychopathy.

Throughout the various steps in the data pipeline and across the various feature generation processes, data is stored in one of the RDBMS instances. All data tables are indexed according to existing selection query clauses. The impact on insertion and updates that occur (which are a minority of database transactions in the overall process) is minimal in comparison to the improvement of query responsiveness from the user perspective. The database storage objects are carefully designed to balance performance and storage impacts by using appropriate indexing and normalization techniques.

Figure 3:
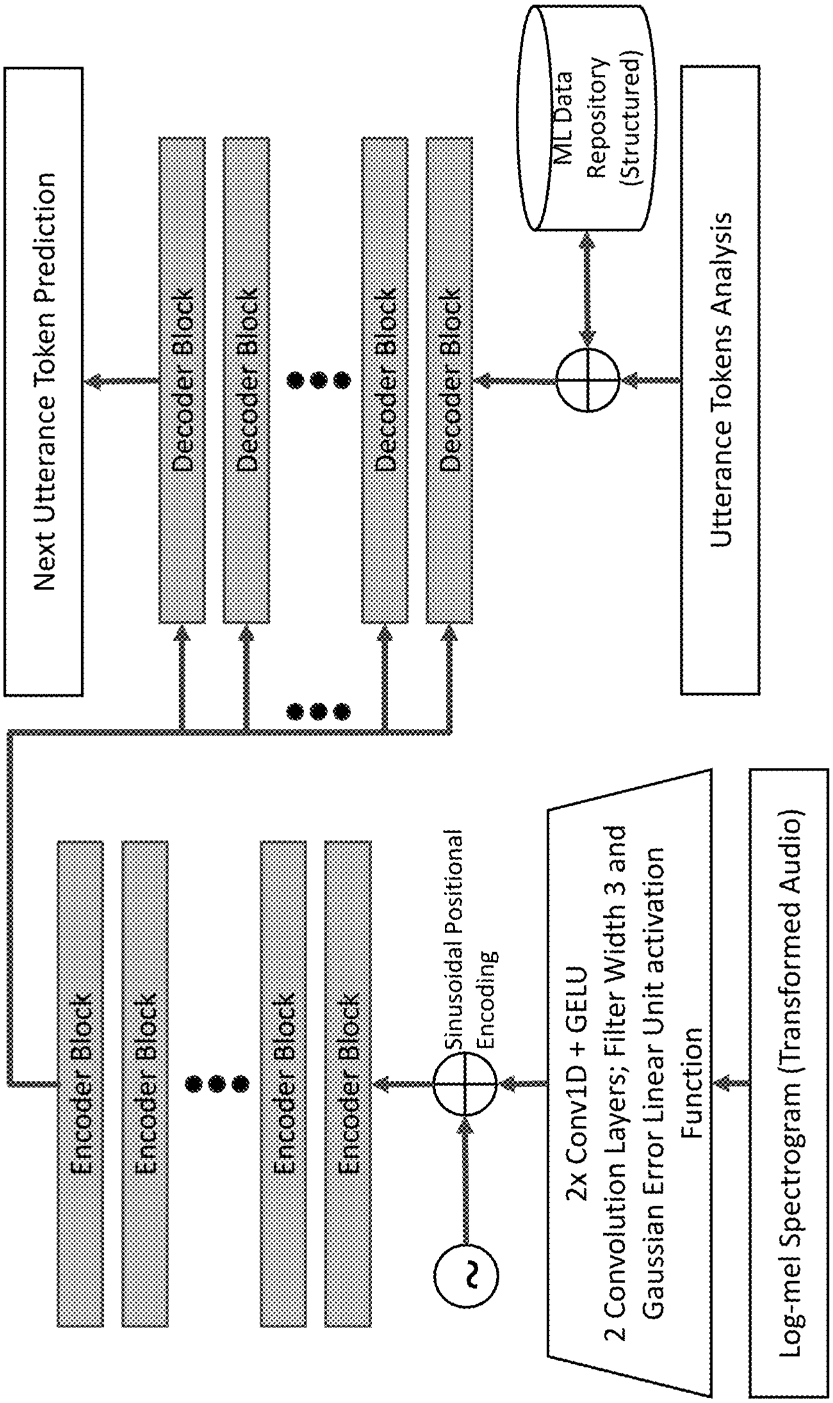
FIG. 3 is a simplified diagram of the ASR transcription process according to the teachings of the present disclosure.

FIG. 3 is a simplified diagram of the ASR transcription process. This process includes a standard ASR foundational approach (i.e., OpenAI's Whisper ASR) in general and represents a component that may be swappable and plug-and-play. Improvements have been made to improve both word error rates and silhouette overlap issues. Specifically, changes have been made to the parameters that are set for offsets, expected language range, language detection range, and how it connects to the Diarization (shown in FIG. 4).

Figure 4:
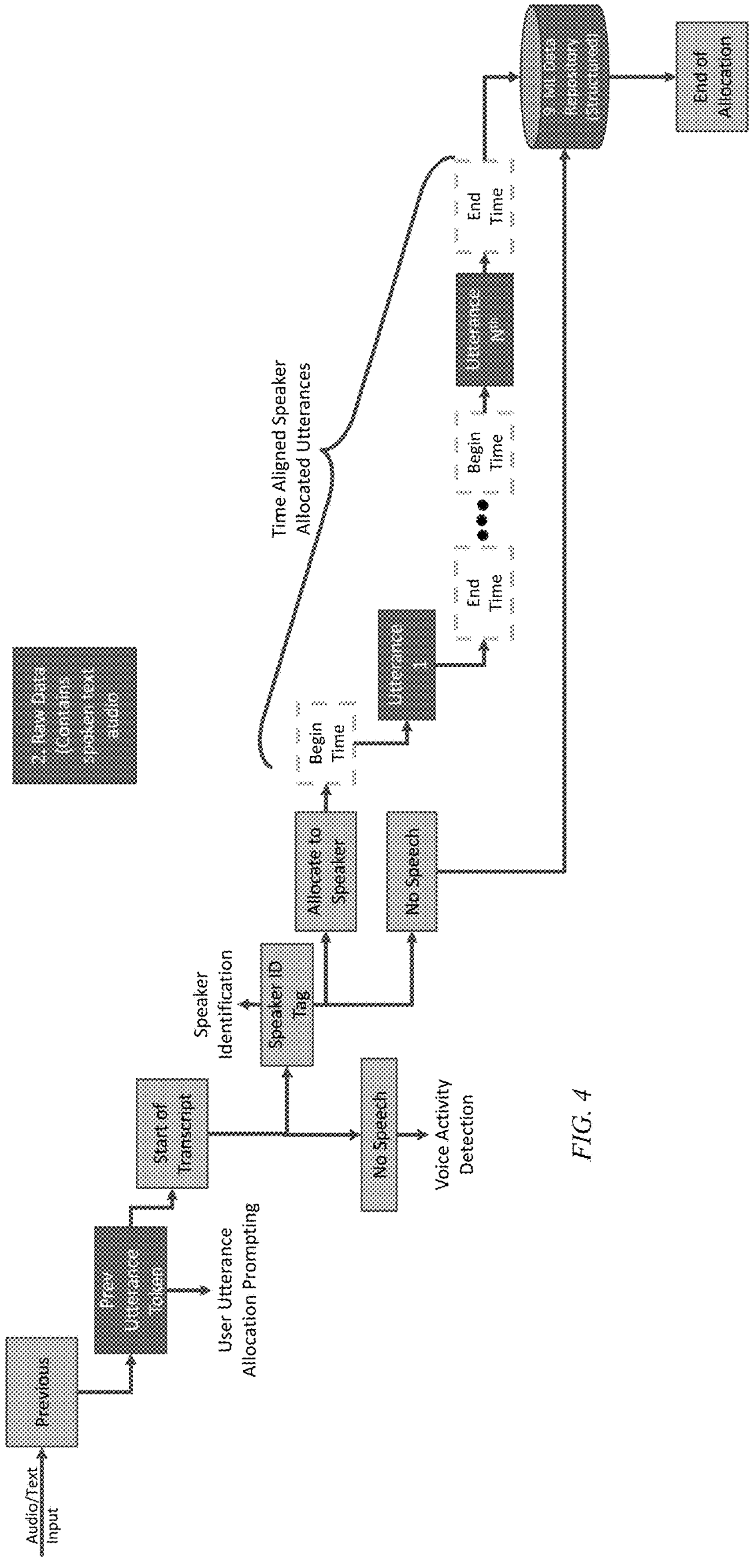
FIG. 4 is a simplified diagram of the diarization process according to the teachings of the present disclosure.

FIG. 4 is a simplified diagram of the diarization process. The diarzation process includes a standard approach for diarization (i.e., Paynote) that may be a plug-and-play swapable part of the system. Specifically novel are the changes made to the injecting of parameters that are set for offsets, expected language range, and language detection range.

Figure 5:
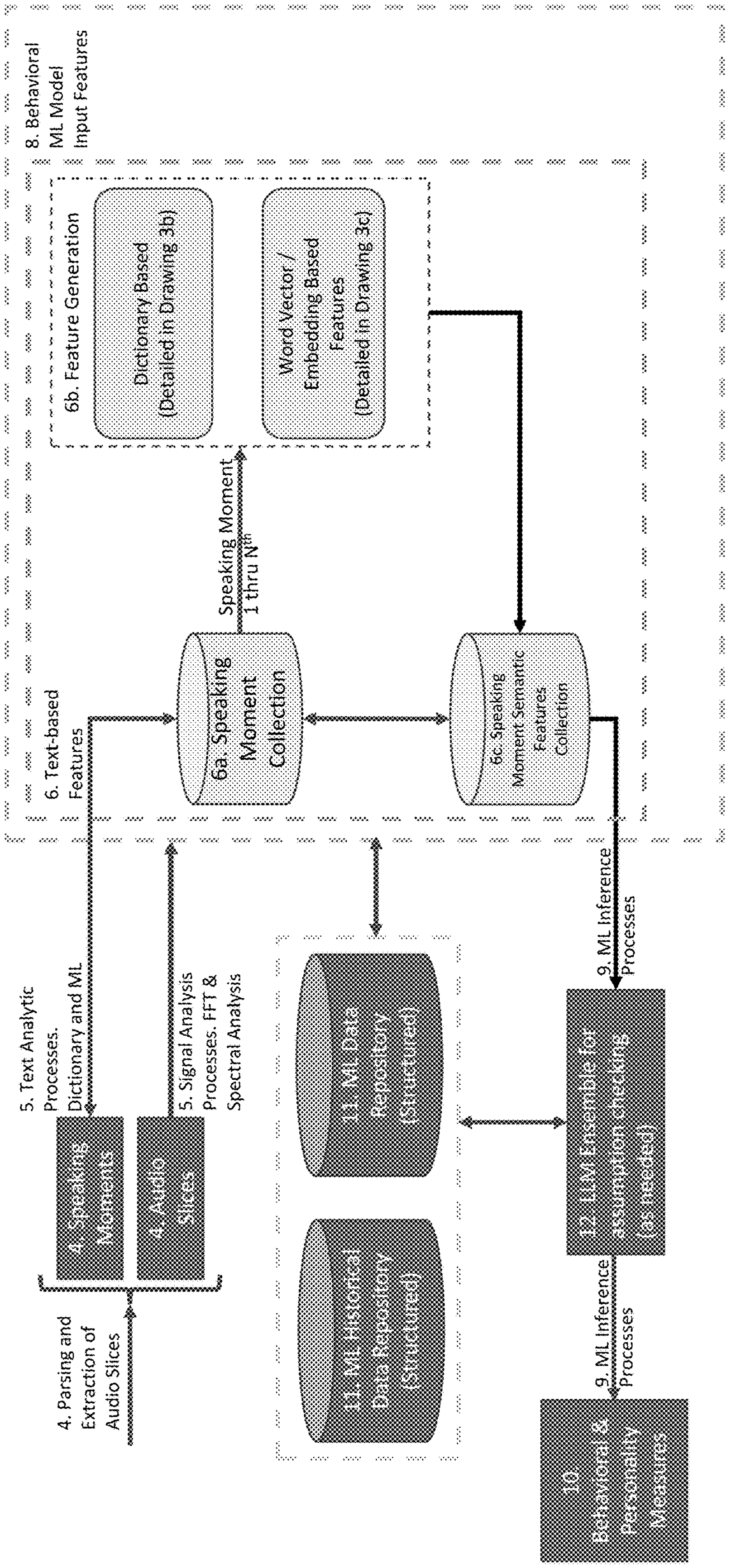
FIG. 5 is a simplified diagram of the text-based features module/process according to the teachings of the present disclosure.

FIG. 5 is a simplified diagram of the text-based features module/process. FIG. 5 describes the semantic (text) based feature generation process at a high level. The feature generation process itself (seen encompassed by the inner dotted blue lines) iterates over provided speaking moments (often referred to as monologues) in the form of text and then iterates over each token (roughly analogous to words) in a given speaking moment. Each token is passed to a feature generation subprocess that falls into either dictionary-based (FIG. 6) or vector-based (FIG. 7) approaches. The feature values (quantities in the form of float/decimal/vector forms (i.e., numbers)) are then stored in a data structure (e.g., table) for later retrieval. The stored values must have some identifier mapping it to the original speaking moment. This allows for alignment mapping to later feature generation processes that are added (such as phonetic features but also additional text features that are developed). This mapping also facilitates the assignment of downstream analysis outputs (ML inference outputs) to a given speaking moment.

Figure 6:
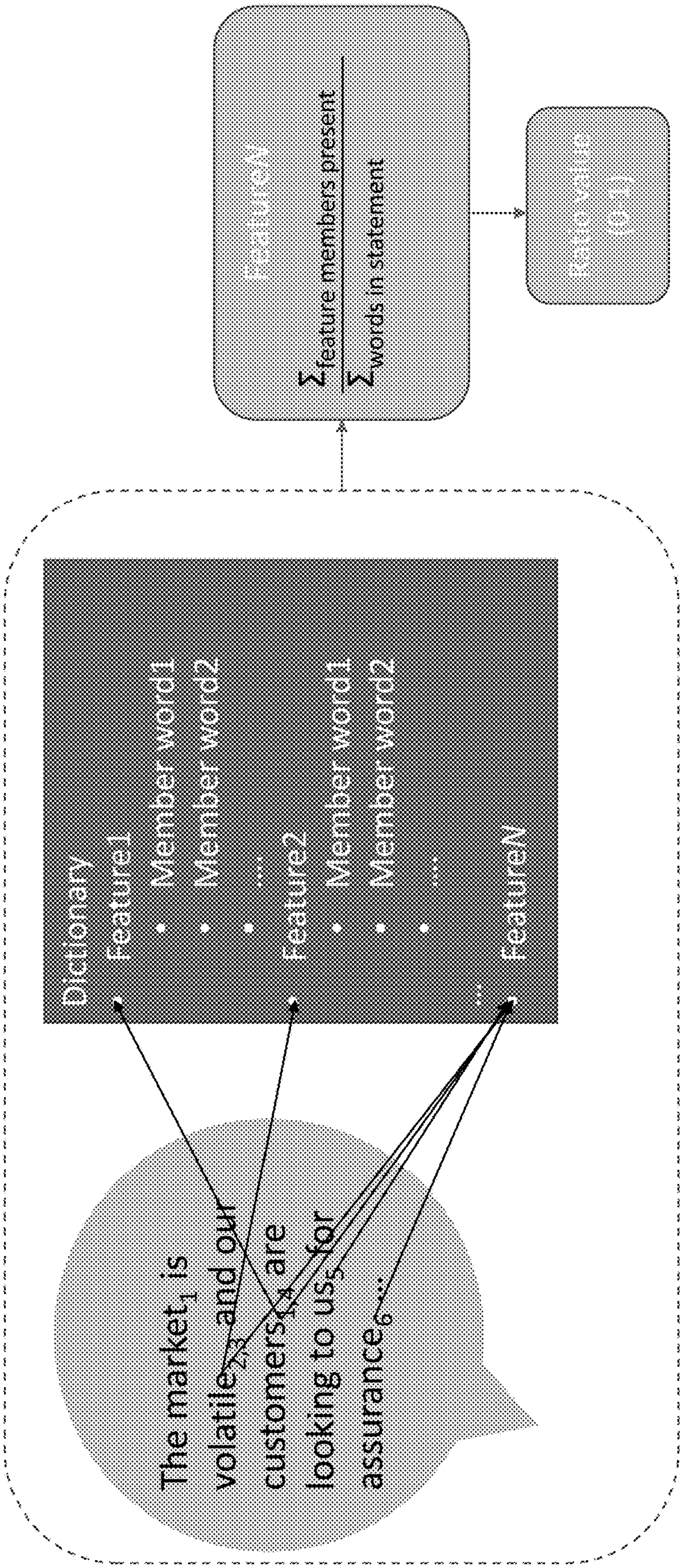
FIG. 6 is a simplified diagram of the dictionary-based feature generation module/process for a given statement or set of statements according to the teachings of the present disclosure.

FIG. 6 is a simplified diagram of the dictionary-based feature generation module/process for a given statement or set of statements. FIG. 6 describes the general process used for dictionary-based feature generation for text. Provided a speaking moment in the form of text, a dictionary, preloaded into memory, contains references for a list of all dictionary-based features needing to be calculated. Each feature in the dictionary has a listing of member words/tokens. The process iterates over the speaking moments and increments up the count of feature member presence. A running count of the total words/tokens in the statement is also kept. At the end of this iteration all feature member presence counts are divided by the total count of words/tokens in the statement. The resulting ratio value becomes the quantity of the feature. This approach necessarily bounds the range of feature values to 0-1 (as a ratio). There will be some automated downstream adjustments to these ratios that are made for some features (e.g.—Communication styles) by weighting the ratio according to a total word percentage value for some subset of dictionary features (because not all dictionary features have equal member word/token counts); this step is not pictured here and applies only in certain cases.

Figure 7:
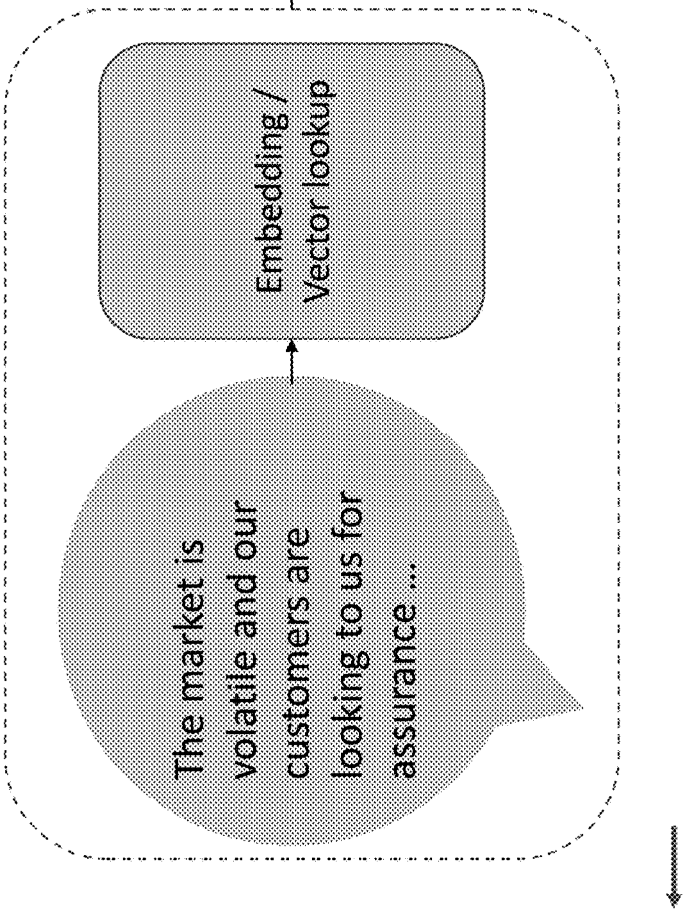
FIG. 7 is a simplified diagram illustrating word vector/embedding-based feature generation module/process for a given statement or set of statements according to the teachings of the present disclosure.

FIG. 7 is a simplified diagram illustrating word2vector/embedding-based feature generation module/process for a given statement or set of statements. FIG. 7 provides a simplified vector/word embedding feature generation process overview. The words in a statement are iterated over and passed to an existing Word2vector/embedding model (e.g., Google's English word2vec model is an example). Word2Vector/Embedding models are ML models that are trained to model word associations in a very high dimensional space from a large corpus of text representing the use of that language. Using a high number of dimensions allows for the "embedding" of word association properties and characteristics through the training process. Word embeddings into a vector space is a foundational technique for a wide range of language processing and enabling technologies, including but not limited to Large Language Models. The raw vectors from the embedding space are used as features and feature-precursors in the processes and for some of the downstream inference models. The vector values represented in this figure serve as a high dimensional quantity for a given token.

Figure 8:
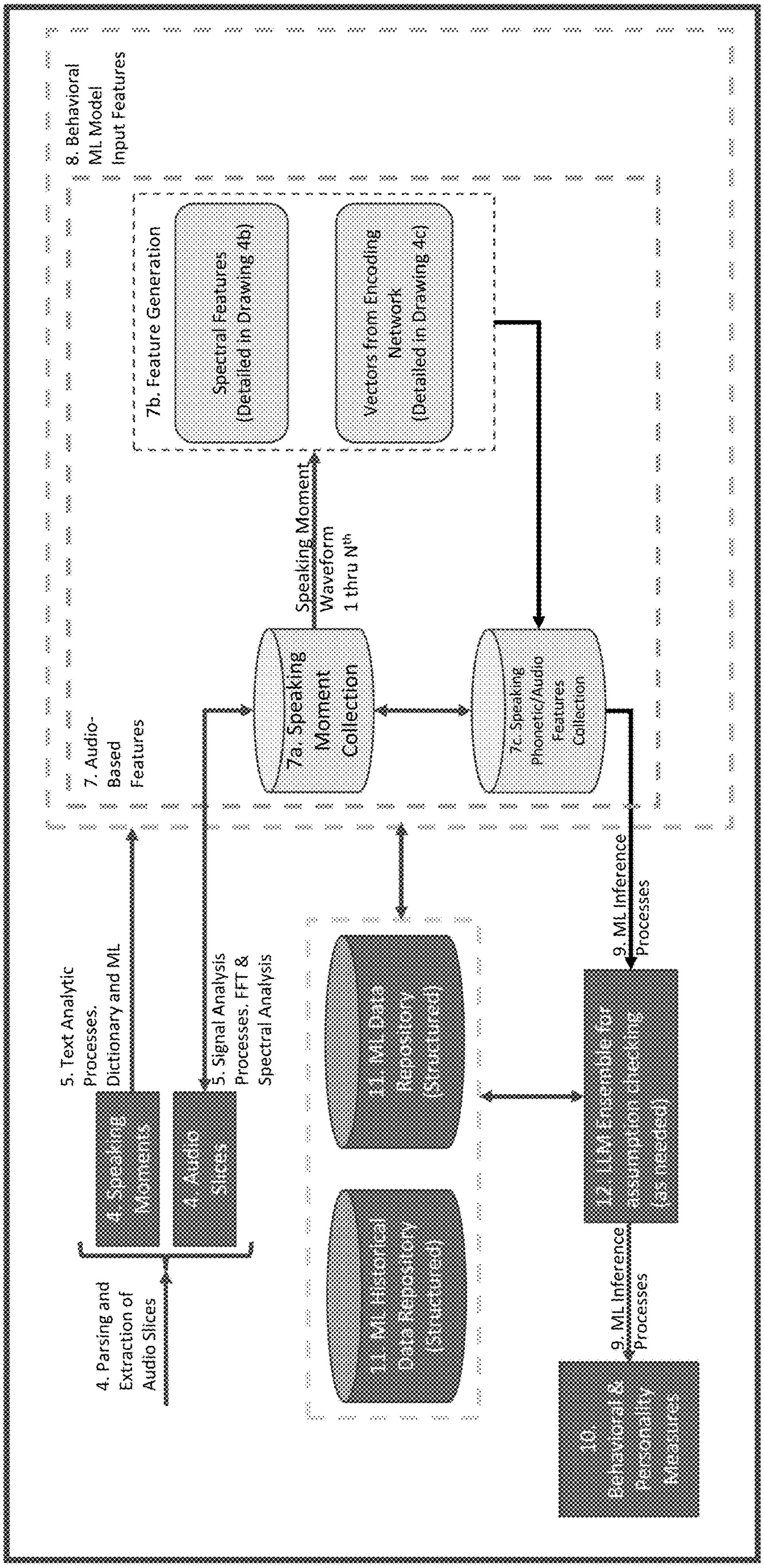
FIG. 8 is a simplified diagram of the audio-based features module/process according to the teachings of the present disclosure.

FIG. 8 is a simplified diagram of the audio-based features module/process. FIG. 8 describes the audio/spectral/phonetic feature generation process at a high level. The feature generation process itself (seen encompassed by the inner dotted blue lines) iterates over provided speaking moments (often referred to as monologues) in the form of audio sequence data (roughly analogous to words) in a given speaking moment. Each token is passed to a feature generation subprocess that falls into either spectral features (FIG. 9) or vector-based (FIG. 10) approaches. The feature values (quantities in the form of float/decimal/vector forms (i.e., numbers)) are then stored in a data structure (e.g., table) for later retrieval. The stored values must have some identifier mapping it to the original speaking moment. This allows for alignment mapping to later feature generation processes that are added (such as phonetic features but also additional text features that are developed). This mapping also facilitates the assignment of downstream analysis outputs (ML inference outputs) to a given speaking moment.

Figure 9:
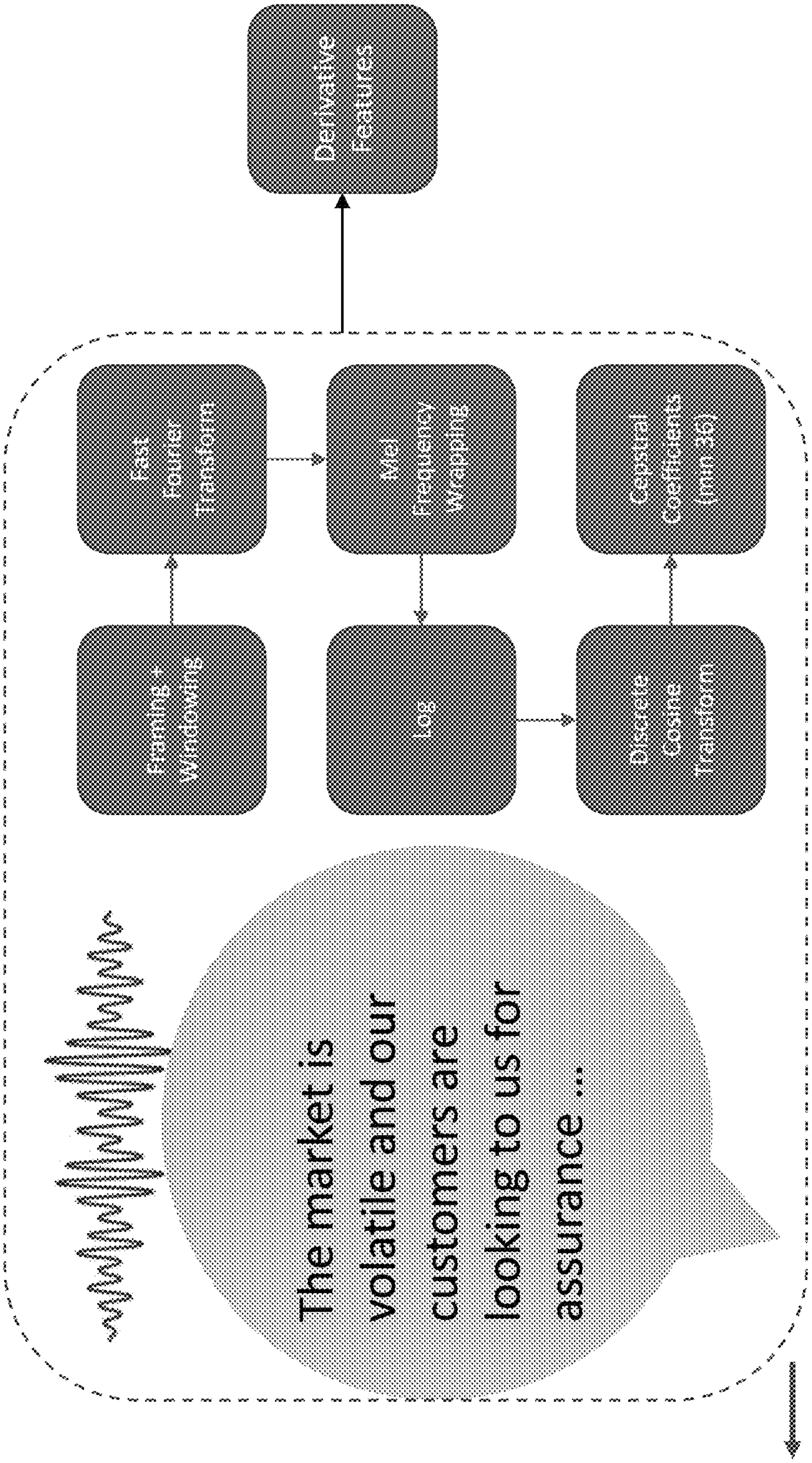
FIG. 9 is a simplified diagram illustrating audio-derived spectral feature generation module/process for a given statement or set of statements according to the teachings of the present disclosure.

FIG. 9 is a simplified diagram illustrating audio-derived spectral feature generation module/process for a given statement or set of statements (MFCC subsets). This figure visualizes the general process of applying an FFT (fast Fourier transformation) to a set of audio given some framing and windowing values to produce spectral features. Many spectral features are derived from mel-frequency cepstral coefficients (MFCCs) though not all are. This is why, in this figure, the internal process ends at MFCC calculations but the derivative features are shown to come from the overall process. The calculation of MFCCs is well known and understood, but the use of a broad range of coefficients is not and is often limited to 20. The approach incorporated in the system and method 100 exceeds this value. There are also some raw FFT values that are extracted and saved from this process to characterize the original frequency mix and to use as inputs for some downstream models. Of particular importance is the saving of distributional characteristics for each given MFCC.

Figure 10:
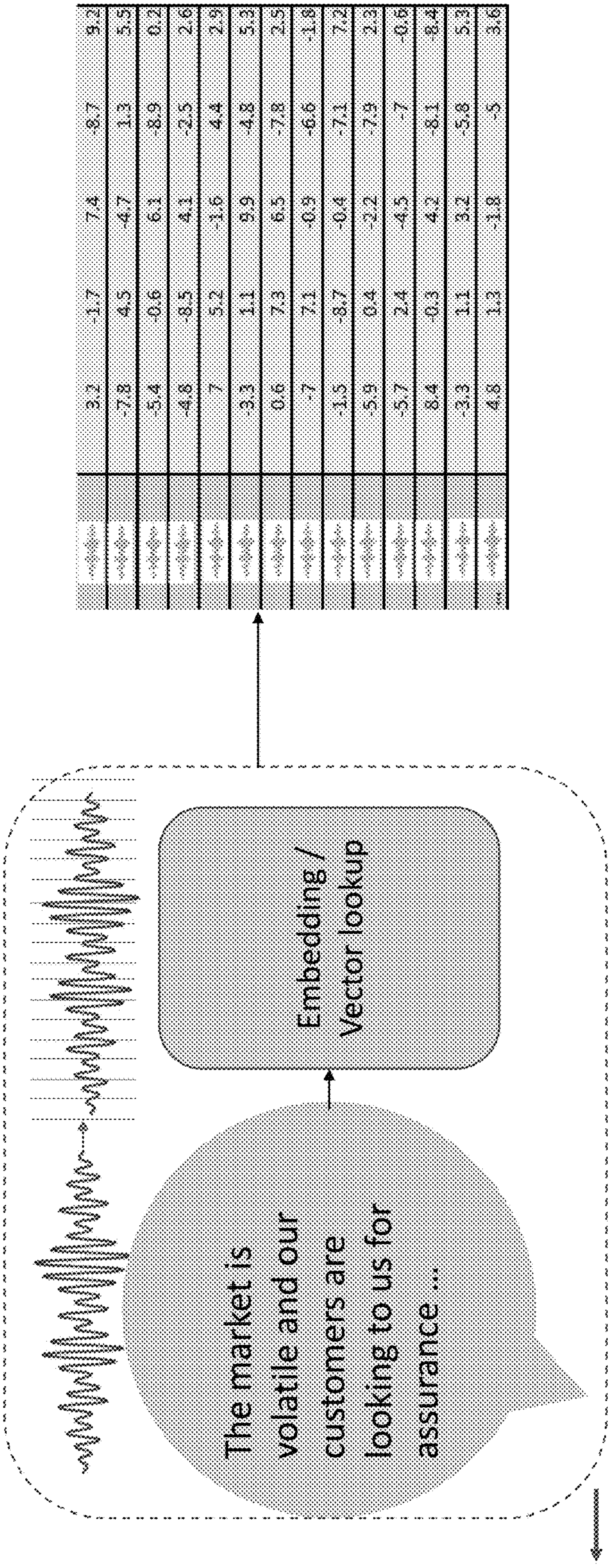
FIG. 10 is a simplified diagram of audio-derived vector/embedding-based feature generation for a given statement or set of statements according to the teachings of the present disclosure.

FIG. 10 is a simplified diagram of audio-derived vector/embedding-based feature generation for a given statement or set of statements. This figure provides a simplified overview of the vector/word embedding feature generation process. The words in a statement are iterated over and passed to an existing word2vector/embedding model (e.g., Google's English word2vec model is an example). Word2Vector/Embedding models are ML models that are trained to model word associations in a very high dimensional space from a large corpus of text representing the use of that language. The use of a high number of dimensions allows for the "embedding" of word association properties and characteristics through the training process (this is not pictured here as this process is completed prior to our use of the resulting model and is well-established in the NLP space). Word embeddings into a vector space is a foundational technique for a wide range of language processing and enabling technologies, including but not limited to LLM's (this is an instrumental aspect of transformer approaches as seen in GPT derivatives in the LLM space). The raw vectors from the embedding space are used as features and feature-precursors in the processes and for some downstream inference models. The vector values represented in this figure serve as high dimensional quantities for a given token.

Figure 11:
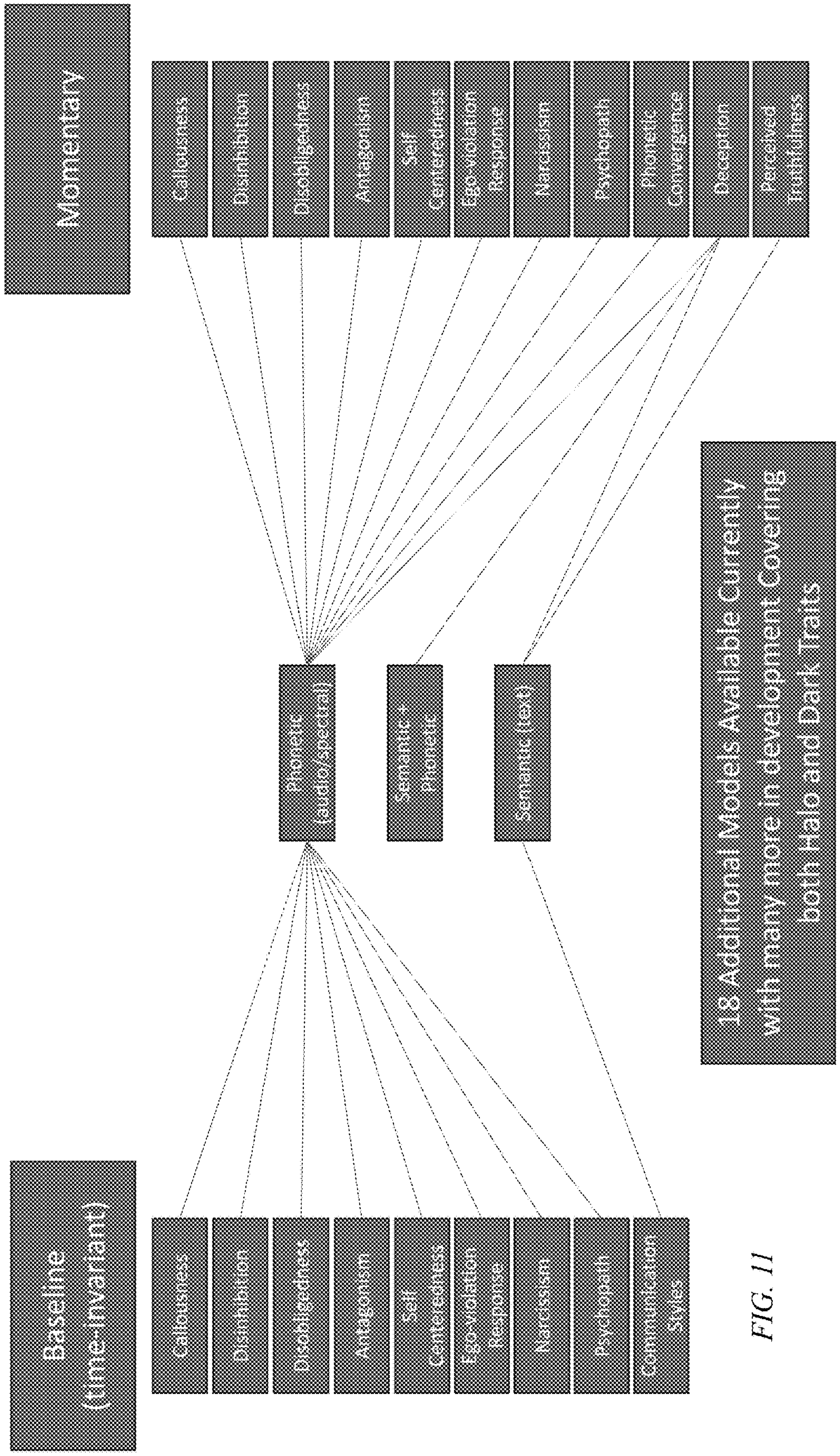
FIG. 11 is a simplified diagram of an embodiment of the inference machine learning models for feature generation according to the teachings of the present disclosure.

FIG. 11 is a simplified diagram that provides the inference machine learning models overview for feature generation. Once the feature generation processes in the data ingestion and initial analysis pipeline have completed, the ML model inference and data presentation steps can be performed. The ML model inference process queries the RDBMS (relational database management system) 222 for features relevant to a given model and conducts a batch inference step. The returned values are then stored in the database for future user queries. The modular design of the model inference pipeline allows the addition, update, and removal of models independent of the feature pipeline.

Figure 12:
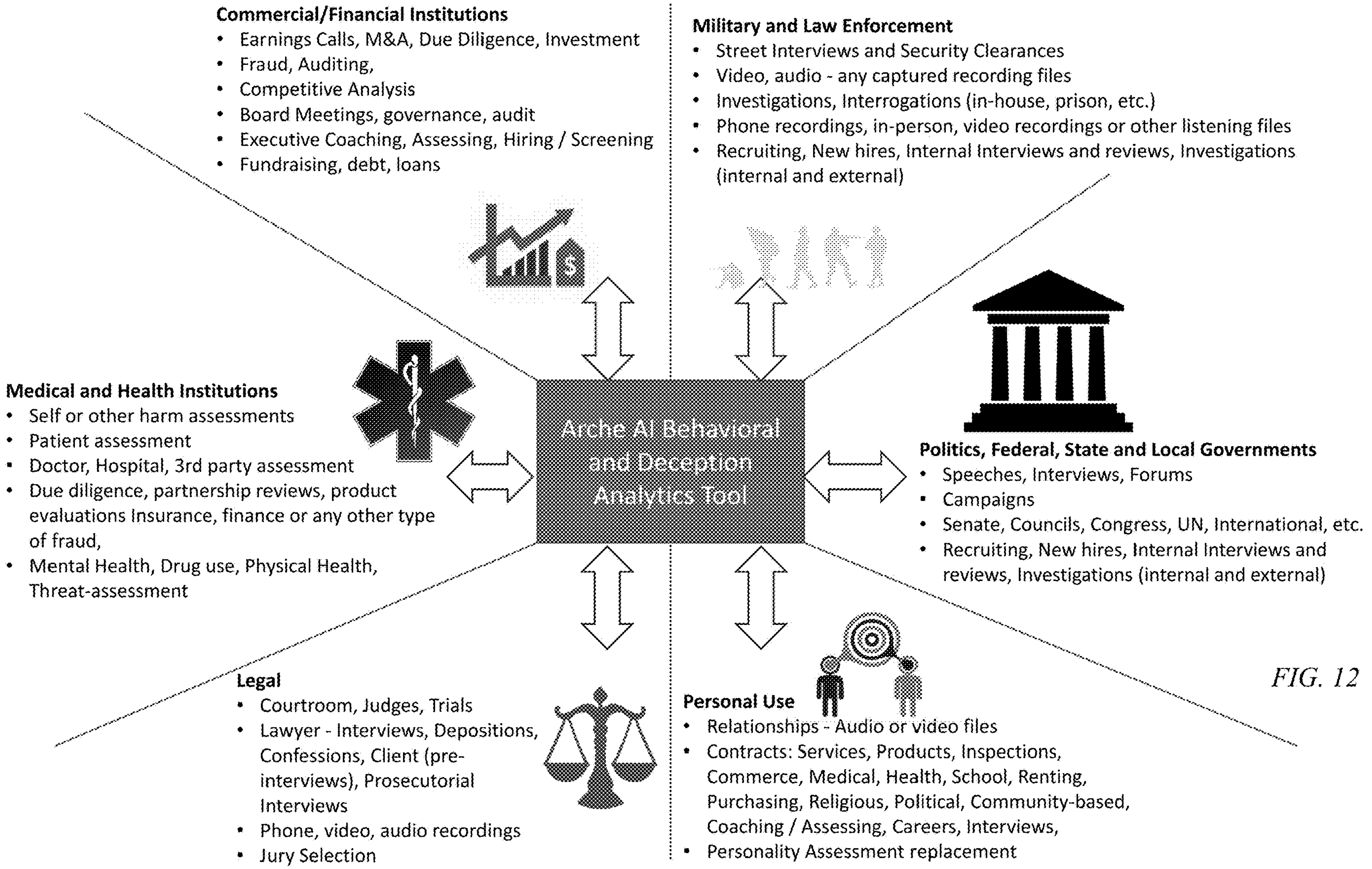
FIG. 12 is a diagram illustrating the use case examples for the AI-based automated personality and behavior analytic and assessment system and method according to the teachings of the present disclosure.

As shown in FIG. 12, the present invention has almost unlimited applications. By using the assessment system and method described herein, biases inherent in people-only evaluations are removed from the analysis. The AI-based automated personality and behavior analytic and assessment system and method may be used to provide multiple insights in a corporate, financial, commercial, and business environment. For example, a company's earnings call is a critical event that provides shareholders, investors, and analysts with insights into the financial health and performance of the organization. The accuracy and transparency of the information shared during these calls are paramount to maintain investor confidence and make informed decisions. By utilizing the AI-based automated personality and behavior analytic and assessment system and method to analyze the earnings calls, all interested parties can further ensure transparency, mitigate potential misrepresentation of financial data, and foster trust with stakeholders.

In addition, the system and method may be used to assess the transparency, credibility, and/or personality features of company executives, program managers, and board members through presentations, events, meetings, interviews, and any other media whereby audio/video or textual (written or transcribed) content may be obtained or retrieved from an archive.

Other commercial applications include using the assessment system 100 for mergers and acquisitions, due diligence processes, contracts, fundraising discussions and interviews, investment analysis, fraud detection, auditing, corporate meetings where governance, integrity, and accountability are imperative. This assessment system may also be used to conduct competitive analysis. The assessment system 100 may be used in recruiting, hiring, employee and executive selection and screening, as well as performance reviews and internal recordings for which company and/or external purposes are needed. Additional uses may be implemented for executive coaching, assessments, and development where insights, interviews, calls, meetings, and a variety of personality and IQ assessments have typically been used in the past. In addition, the assessment system 100 may be used in fundraising by both the company and executives raising funds as well as the investors and funders analyzing the companies to mitigate risk and improve transparency of both parties. This is also true of those seeking debt and loans and the individuals and institutions lending to these companies. Finally, the assessment system 100 may be used in sales calls and meetings as well as customer calls and meetings and various other interactions that may include, but is not limited to:

Financial, revenue, and product projections and integrity
Earnings Calls (stockholders, analysts, investors)*Two-sided. Those listening and those on the call.
Company and/or executive presentations, interviews (media, corporate, event, etc.) M&A, Due Diligence, Investment
Fraud, Auditing,
Competitive Analysis (i.e., Pharmaceuticals analyzing competition)
Employee Hiring, Recruiting, new hires, performance reviews, employee interviews (or employee recording files)
Sales Calls
Board Meetings, governance, audit
Contracts
Executive Coaching, Assessing, Hiring/Screening
Fundraising, debt, loans The assessment system 100 may be used in medical and health settings such as self or other harm assessments, patient assessments, doctor, hospital, third party assessments, due diligence, partnership reviews, product evaluations, insurance, finance, or any other type of fraud, mental health, drug use, physical health, and threat-assessments.

The assessment system 100 may be used in military and law enforcement settings such as street interviews, security clearances, video, audio-any captured recording files, investigations, interrogations (in-house, prison, etc.), phone recordings, in-person, video recordings or other listening files, recruiting, new hires, internal interviews and reviews, investigations (internal and external), and threat-assessments.

The assessment system 100 may be used in legal settings such as courtrooms, courts, trials, lawyer interviews, depositions, confessions, client (pre-interviews), prosecutorial interviews, phone, video, audio recordings, and jury selection.

The assessment system 100 is used in politics, federal, state, and local government settings such as speeches, interviews, forums, campaigns, senate, councils, congress, the UN, international, recruiting, new hires, internal interviews and reviews, and internal and external investigations.

The assessment system 100 may be used in personal and human interactions settings such as: relationships-audio or video files, contracts (services, products, inspections, commerce, medical, health, school, renting, purchasing, religious, political, community-based, coaching/assessing, careers, interviews), and personality assessment and/or cultural fit.

Figure 13:
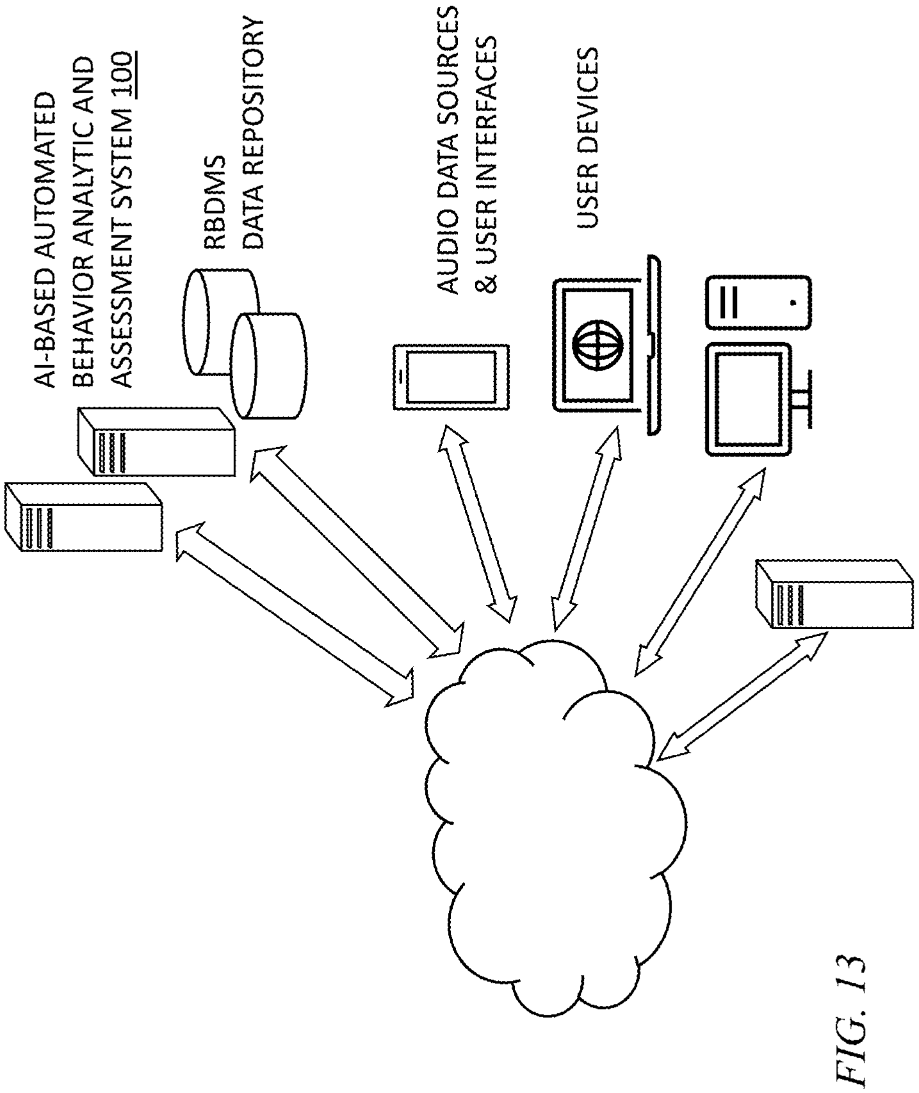
FIG. 13 is a simplified block diagram of the operating environment of the AI-based automated personality and behavior analytic and assessment system according to the teachings of the present disclosure.

FIG. 13 is a simplified block diagram of an example of the SaaS implementation of the AI-based automated personality and behavior analytic and assessment system and method 100 described herein. However, it should be noted that although the assessment system and method and the associated databases described herein may be primarily cloud-based (SaaS), the system and method can also be implemented to reside and execute on a computer or mobile device co-located with the source of the audio speech data to be analyzed. Further, the source of the audio speech and the interested party who will receive or analyze the resultant output data may also be co-located.

It should be noted that text analytics relates to the process to extract useful and meaningful information from unstructured text data. Text analysis involves various techniques to process, clean, and transform text data into a structured format that can be used for further analysis. Some common tasks in text analysis include text preprocessing to remove unwanted characters, special symbols, punctuation and converting text to lowercase, tokenization to break down the text into individual words or tokens, stopword removal to remove common words like “the,” “and,” “is,” etc., which do not add significant meaning to the text, stemming or lemmatization to reduce words to their base or root form, named entity recognition (NER) to identify and classify entities such as names, locations, organizations, etc., and sentiment analysis to determine the sentiment or emotion expressed in the text (positive, negative, neutral).

The features of the present invention, which are believed to be novel, are set forth below with particularity in the appended claims. However, modifications, variations, and changes to the exemplary embodiments of the invention described above will be apparent to those skilled in the art, and the described herein thus encompasses such modifications, variations, and changes and are not limited to the specific embodiments described herein.

What is claimed is:

1. An AI-based automated personality and behavior analytic and assessment system, comprising:
a machine learning data repository storing unstructured and structured training data;
an input interface configured for receiving input data containing signals related to audio speech;
an automatic speech recognition, diarization, and transcription module configured to receive the input data, recognize the spoken words in the input data, and generate an output representing the spoken words attributed to the individual, the output including speaking moments and audio slices;
a machine learning text-based feature generation pipeline configured to receive the speaking moments and generate a numerical text-based feature set;
a machine-learning audio-based feature generation pipeline configured to receive the audio slices, perform Fast Fourier Transform (FFT) spectral and signal analysis on the audio slices to extract spectral features comprising prosodic features to generate a numerical audio-based feature set;
a machine learning inference processor configured to receive both of the numerical text-based feature set and the numerical audio-based feature set, develop inferences from both feature sets, and generate a set of scores representing the probabilities for a number of personality and behavioral traits; and
a user interface configured to present information related to the generated set of scores to a user.

2. The system of claim 1, wherein at least a portion of the input data comprises real-time speech data.

3. The system of claim 1, wherein at least a portion of the input data comprises a stored file containing audio data.

4. The system of claim 1, wherein the user interface is configured to display the information related to the generated set of scores via the web browser-based interface, via an application programming interface, and in curated final reports in PDF format.

5. The system of claim 1, wherein the system is configured to align problem-relevant features to a inference model's target space.

6. The system of claim 1, wherein the system future comprises a large language model evaluation process configured to have an ensemble of large language models that are a mixture of fine-tuned and retrieval-augmented generative variants.

7. The system of claim 1, wherein the ensemble of large language models is configured to evaluate final inference model assumption requirements.

8. The system of claim 7, wherein the assumption requirements are configured to include an establishment of a cognitive load-inducing situation characterizing the statement being assessed, and an evaluation of inference model appropriateness for statement content.

9. An AI-based automated personality and behavior analytic and assessment method, comprising:

receiving input data containing signals related to audio speech;

receiving the input data, recognizing the spoken words in the input data, and generating an output representing the spoken words attributed to the individual, the output including speaking moments and audio slices;

receiving the audio slices, performing Fast Fourier Transform (FFT) spectral and signal analysis on the audio slices to extract spectral features comprising prosodic features for generating a numerical audio-based feature set;

receiving the numerical audio-based feature set, developing inferences from the audio-based feature set, and generating a set of scores representing the probabilities that the individual possesses a number of personality and behavioral traits; and presenting information related to the generated set of scores to a user.

10. The method of claim 9, wherein receiving input data comprises receiving real-time speech data.

11. The method of claim 9, wherein receiving input data comprises receiving a stored file containing audio data.

12. The method of claim 9 further comprises displaying the information related to the generated set of scores via the web browser-based interface, via an application programming interface, and in curated final reports in PDF format.

13. The method of claim 9, comprises aligning problem-relevant features to a inference model's target space.

14. The method of claim 9, comprises a large language model evaluation process evaluating an ensemble of large language models based on a mixture of fine-tuned and retrieval-augmented generative variants.

15. The method of claim 14, comprises the ensemble of large language models evaluating final inference model assumption requirements.

16. The method of claim 15, wherein evaluating the assumption requirements comprises evaluating a cognitive load-inducing situation characterizing the statement being assessed and evaluating inference model appropriateness for statement content.

17. A non-transitory computer readable medium having encoded thereon instructions for performing an AI-based automated personality and behavior analytic and assessment method, the method comprising:

receiving input data containing signals related to audio speech;

receiving the input data, recognizing the spoken words in the input data, and generating an output representing the spoken words attributed to the individual, the output including speaking moments and audio slices;

receiving the speaking moments and generating a numerical text-based feature set;

receiving the audio slices, performing Fast Fourier Transform (FFT) spectral and signal analysis on the audio slices to extract spectral features for generating a numerical audio-based feature set;

receiving the numerical text-based feature set and the numerical audio-based feature set, developing inferences from both feature sets, and generating a set of scores representing the probabilities that the individual possesses a number of personality and behavioral traits; and presenting information related to the generated set of scores to a user.

18. The method of claim 17, further comprising performing text analysis, dictionary, and vector model processing on the speaking moments.

19. The method of claim 17 further comprises displaying the information related to the generated set of scores via the web browser-based interface, via an application programming interface, and in curated final reports in PDF format.

* * * * *